US008606189B2

(12) United States Patent
Guo (10) Patent No.: US 8,606,189 B2
(45) Date of Patent: Dec. 10, 2013

(54) SYSTEM AND METHOD FOR WIDEBAND WIRELESS SYSTEM SCANNING

(75) Inventor: Yuelun Guo, Potomac, MD (US)

(73) Assignee: PCTEL, Inc., Bloomingdale, IL (US)

( * ) Notice: Subject to any disclaimer, the term of this patent is extended or adjusted under 35 U.S.C. 154(b) by 570 days.

(21) Appl. No.: 12/983,961

(22) Filed: Jan. 4, 2011

(65) Prior Publication Data

US 2012/0171966 A1 Jul. 5, 2012

(51) Int. Cl.
*H04B 17/00* (2006.01)

(52) U.S. Cl.
USPC ........................................ 455/67.11; 455/558

(58) Field of Classification Search
USPC .............. 455/67.11, 63.1, 423, 558
See application file for complete search history.

(56) References Cited

U.S. PATENT DOCUMENTS

| | | | |
|---|---|---|---|
| 6,400,948 B1 * | 6/2002 | Hardin ........................... | 455/434 |
| 7,453,822 B2 * | 11/2008 | Van Slyke et al. ............ | 370/252 |
| 7,826,391 B2 * | 11/2010 | Van Slyke et al. ............ | 370/252 |
| 2004/0110518 A1 * | 6/2004 | Swift et al. .................... | 455/501 |
| 2004/0259558 A1 * | 12/2004 | Skafidas et al. ............... | 455/450 |
| 2005/0197093 A1 * | 9/2005 | Wiklof et al. ............... | 455/343.1 |
| 2006/0159106 A1 * | 7/2006 | Slyke et al. ............... | 370/395.21 |
| 2008/0080399 A1 * | 4/2008 | Wang et al. ................... | 370/254 |
| 2009/0040939 A1 * | 2/2009 | Van Slyke et al. ............ | 370/252 |
| 2009/0221287 A1 * | 9/2009 | Balasubramanian et al. .............................. | 455/434 |
| 2009/0247160 A1 * | 10/2009 | Muller ....................... | 455/435.3 |
| 2010/0159899 A1 * | 6/2010 | Horn et al. ................. | 455/414.1 |
| 2011/0268044 A1 * | 11/2011 | Yun et al. ...................... | 370/329 |
| 2013/0010590 A1 * | 1/2013 | Vasseur et al. ................ | 370/221 |

* cited by examiner

*Primary Examiner* — Lewis West (74) *Attorney, Agent, or Firm* — The Marbury Law Group PLLC (57) ABSTRACT

A system and method for determining the presence of interfering signals in a wireless environment. A programmable RF card is programmed to collect a wideband signal based upon user requested signals of interest. Collected signals are analyzed and the presence of specific interfering signals is determined. The interfering signals are then tracked and reported.

13 Claims, 7 Drawing Sheets

Channelized result

SYSTEM AND METHOD FOR WIDEBAND WIRELESS SYSTEM SCANNING

BACKGROUND

In a cellular wireless wideband system, signals from different base stations may interfere with each other on the same channel or on adjacent channels. A scanner is used to measure the interference of each channel of the wireless system. The scanner utilizes a channel list and a signal type to search possible signals for channels in the list. For each channel, the scanner reports all signals that it detects and measures the power and/or quality of each signal. This process is sometimes referred to as a "Top N" signal scan.

The method is based on the assumption that all channels are uniformly separated in frequency. The current Top N signal scan method is thus best suited to detect interference that occurs across channels including: (a) co-channel interference in which the expected signal and interference signals are on the same channel; (b) adjacent interference in which the expected signal and interference signals are one channel space away; (c) alternative interference in which the expected signal and interference signals are two channel spaces away; and (d) other channel differentiated interference.

With the above definitions, a user can search an interference source by scanning the expected channel and nearby channels sequentially. Typically, a scanning receiver is used in conjunction with a drive test system. The scanning receiver may be configured to automatically and continuously sweep across a pre-selected frequency, plotting signal occupancy within the frequency spectrum being swept.

A typical scanning receiver measures the Top N strongest signals according to a specified wireless protocol. By way of illustration, a Top N procedure may involve the following steps: (1) tune the scanner RF hardware to the carrier frequency of the channel that needs to be measured; (2) down convert the RF signal to baseband and sample the data to memories; (3) according to different wireless protocols, detect the various signals in the collected data; (4) measure the signal power and/or quality of the identified signals and report the results; and (5) tune to the next channel in the channel list. The steps are repeated until all channels in the list have been scanned.

The scanning process for multiple channels thus requires that signal acquisition and processing steps be performed sequentially. Signal data is thus acquired multiple times, thereby increasing processing cycles and the time to produce meaningful results.

The Top N procedure may not be ideally suited for all protocols. In a modern wireless system, such as a system using orthogonal frequency-division multiplexing (OFDM), the assumption that all channels are uniformly separated in frequency cannot be assured. Thus, the modes of potential interference may be more complicated.

For example, in the emerging Long Term Evolution (LTE) standard under consideration by the 3rd Generation Partnership Project (3GPP), the signal bandwidth may be configured from 1.4 MHz to 20 MHz. LTE adopts OFDMA as the downlink channel. The bandwidth of the channel can be configured to 1.4 MHz, 3 MHz, 5 MHz, 10 MHz, 15 MHz and 20 MHz. If a 1.4 MHz signal has partially overlapped a 20 MHz signal, it is difficult to determine the interference type with conventional Top N scanning because the assumption that channels are uniformly separated is no longer valid.

SUMMARY

Embodiments herein provide system and methods that utilize a scanning architecture that analyze signals from multiple channels in a single scan and can differentiate interference sources in overlapping channels. In the embodiments illustrated herein, a user determines the wideband wireless bands of interest to be scanned for in advance. Using this list, a data collection engine (DCE), which controls the center frequency, sampling rate (which is equivalent to collection bandwidth) and time to start/stop data collection, instructs an RF scanning card as to how to scan for the wireless bands of interest. Thereafter, signals are then collected, buffered and analyzed based upon an a prior knowledge of the possible interfering bands that are potentially present.

Upon detection of interfering wireless bands, a target list is created that definitively identifies the interfering bands that are present. This interfering band information is then used to track the interfering channels during scanning operations.

DETAILED DESCRIPTION

Embodiments herein provide system and methods that utilize a scanning architecture that analyze signals from multiple channels in a single scan and can differentiate interference sources in overlapping channels.

In certain embodiments described below, a signal evaluation system is applied to an LTE OFDM environment. However, this is not meant as a limitation. The signal evaluation system may be applied to analyze multiple channels from a single scan in other environments in which signal patterns can be defined to isolate channels from single and multiple sources.

Figure 1:
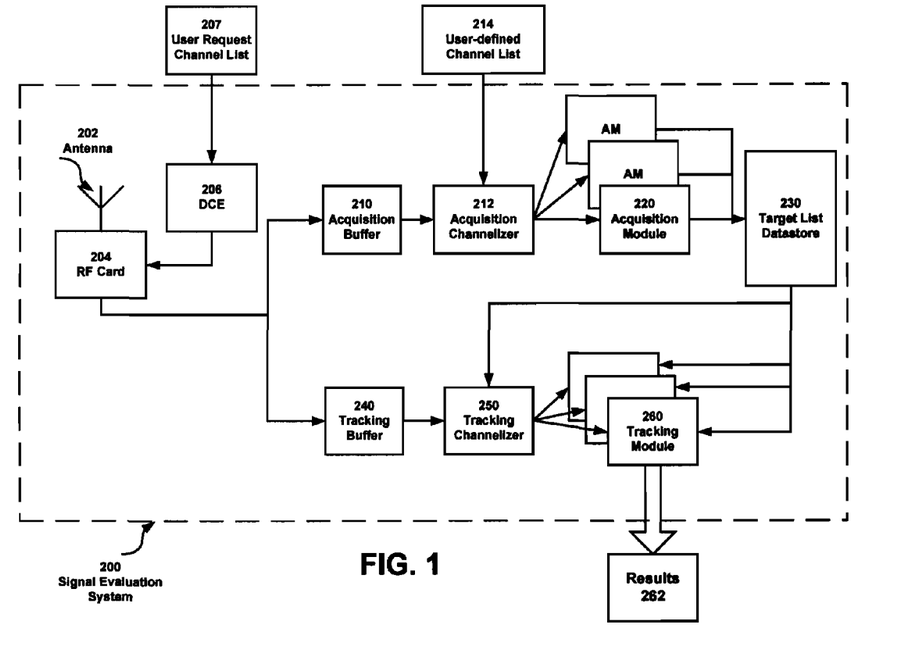
FIG. 1 is a block diagram illustrating the components of a multiple channel signal evaluation system according to an embodiment.

FIG. 1 is a block diagram illustrating the components of a multiple channel signal evaluation system according to an embodiment. The signal evaluation system 200 comprises an antenna 202 that provides a wideband signal to an RF card 204. The RF card 204 tunes the frequency to a center frequency of a target signal and samples I and Q data at a selectable complex sampling rate using an analog to digital converter (ADC) (not illustrated).

Hardware to accomplish the scanning in the embodiments noted below generally comprises a scanner having an antenna 202, RF card 204 and digital processor card comprising all of the functions noted with the exception of user request channel list 207 and user-defined channel list 214. Information is exchanged between a PC or equivalent processor/server and the scanner system 200 via a wired or wireless connection over which request/response messages between scanner and processor/server takes place. Once a scan is completed, all the scan results 262 may be downloaded and saved to a PC or other server/processor via a wired or wireless connection, the internet or other network means. All the user requested channel or other information is sent to scanner via a wired or wireless network, cable, internet or other type of connections or networks known in the art.

In an embodiment, the sampling rate is related to the bandwidth of the signal of interest. That is, the sample rate should be greater than the bandwidth of the signal of interest (to meet Nyquist constraints) but should not be significantly greater than the bandwidth for efficient operation of ADC devices. For example, a sampling rate for a signal having a bandwidth of 5 MHz may be 7.68 MHz while the sampling rate for a 1.4 MHz signal may be 1.92 MHz.

In an embodiment, the tuning of the RF card 204 is controlled by a data collection engine (DCE) 206. The DCE 206 may be configured to calculate the center frequency of a signal of interest from the information provided by User Request Channel List 207. The computed center frequency is used to tune the RF card 204 to capture a wideband signal of desired bandwidth and frequency. In this context, the signal is a "wideband" signal in that the signal has a bandwidth sufficient to encompass multiple channels of the wireless system under test.

In an embodiment RF Card 204 is a hardware card having a fixed sampling rate. DCE 206 receives information concerning user defined channels of interest stored in the User Request Channel List 207. This request channel list comprises information relating to channels from varying wireless bands that a particular user wants to evaluate at the time of a particular scanning activity. Based on the capability of RF Card 204, DCE 206 combines multiple channel requests into a single data collection and determines the center frequency around which the RF Card 204 will collect. Instructions are then sent to the RF Card 204 from the DCE 206 to collect data. For example, if the RF Card's sampling rate is 30.72 MHz, and the user requests two WCDMA channels that are very close to each other, DCE 206 will decide whether a single data collection can be accomplished and if so, it will send the center frequency information to the RF Card 204.

The RF card 204 samples the received RF signal via antenna 202 and sends the sampled (collected/received) data to the acquisition buffer 210 and the tracking buffer 240. In an embodiment, the data collected in an LTE environment are aligned with a 5 ms boundary such that the arrival time of a sync signal can be easily predicted. The acquisition buffer 210 communicates the sample data to an acquisition channelizer 212. In an embodiment, the acquisition channelizer 212 receives channel information in the form of user input. In an embodiment, the channel information is provided via a user-defined channel list 214 that is appropriate to the modulation protocol of the signals to be evaluated. The user requested channel list 214 is a predefined list that contains the possibilities of the presence of certain wireless signals on a certain channel. For example, if user requests a 20 MHz LTE signal scan on American PCS band (which is around 1900 MHz frequency), it may be the case that the same band may also be used for GSM and WCDMA, etc. The user defined channel list 214 will tell the scanner of the possibility of other wireless signals that may interfere with LTE signal. The user defined channel list informs the Acquisition Channelizer 212 how to filter out the signal from the wideband input signal collected by RF card 204.

Figure 2:
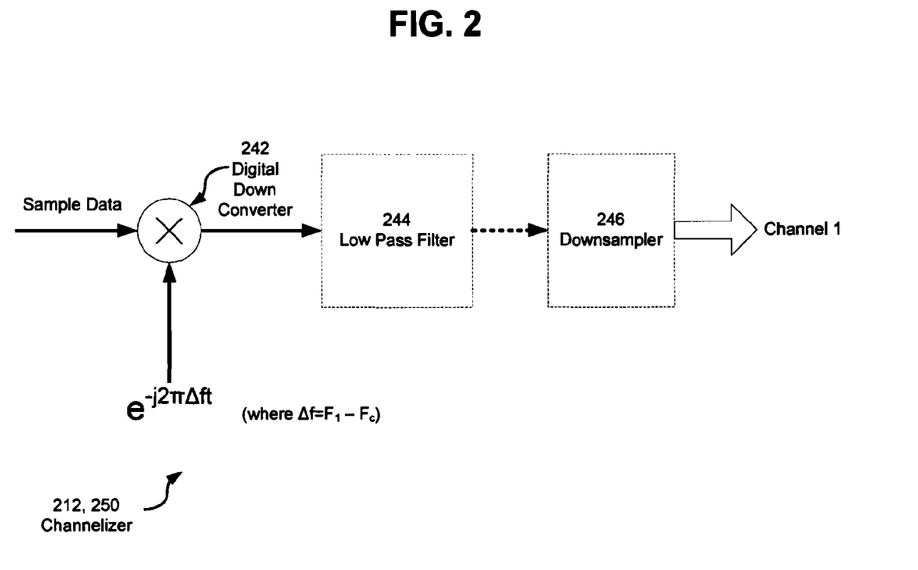
FIG. 2 is a block diagram of components of an acquisition channelizer according to an embodiment.
Figure 3:
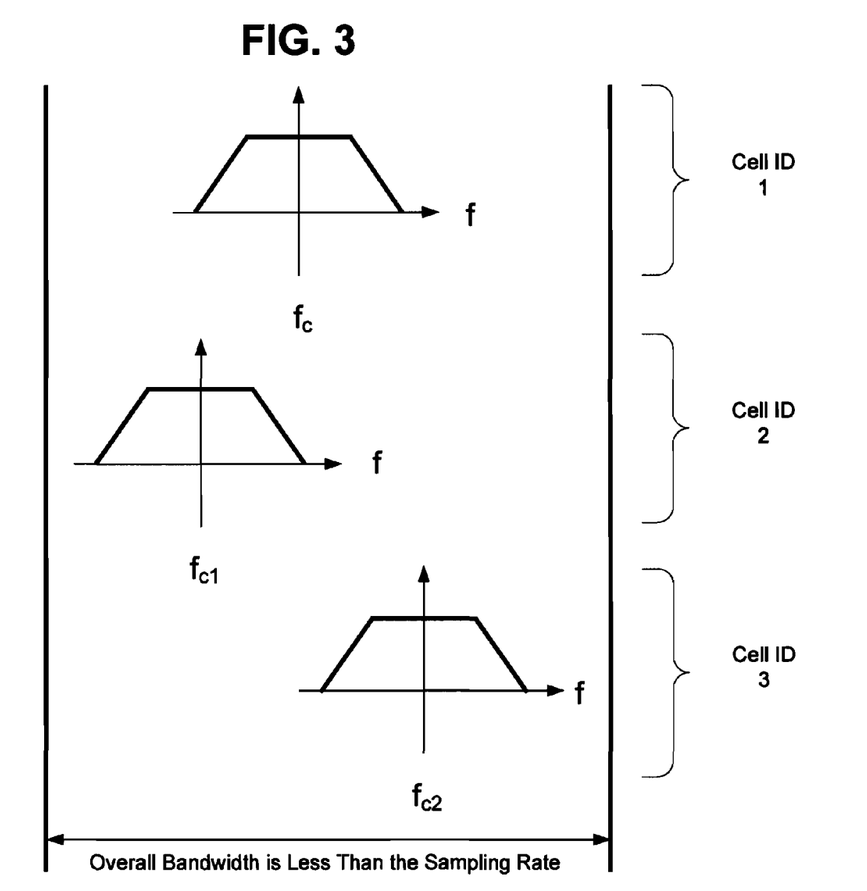
FIG. 3 are frequency plots that illustrate a relationship between discrete channels identified in a single scan according to an embodiment.

FIG. 2 is a block diagram of components of an acquisition channelizer 212 according to an embodiment. As illustrated in FIG. 2, the sample data and a signal equal to $F_1$-$F_c$ are received at a digital down converter 242. Again assuming that the signal of interest has a bandwidth of 5 MHz and the RF card 204 uses a complex sampling rate of 7.68 MHz, a signal having a bandwidth of 7.68 MHz may be recovered without violating the Nyquist sampling constrains. Thus, if the overall occupied bandwidth of signals and interference is less than the sampling rate (in this example, the sampling rate is 7.68 MHz), all of the signals may be discretely identified. This identification process is performed by the channelizer 212 and is illustrated in FIG. 3.

Referring again to FIG. 2, a digital down converter 242 shifts the spectrum to the baseband. Where the sampling rate is approximately equal to the overall bandwidth of the signal of interest, downsampling and filtering are not required and the low pass filter 244 and the downsampler 246 are not used.

In another embodiment, the RF card 204 is tuned to the center of a wideband signal that encompasses multiple channels. In this embodiment, the sampling rate is increased to accommodate the wideband signal. The wideband signal is converted to baseband (see, FIG. 4), then the frequency is shifted by the digital downconverter 242 and passed through the lowpass filter 244 to remove the all but a channel of interest (see, FIG. 5). The channel of interest is down sampled using a sampling rate appropriate to the signal that remains. The acquisition of the remaining channel is performed in a similar manner, with the frequency shift being adjusted to isolate another channel of interest. Because data for multiple channels may be captured simultaneously and stored in the acquisition buffer 210, a single collection process may be used to acquire multiple channels.

Figure 4:
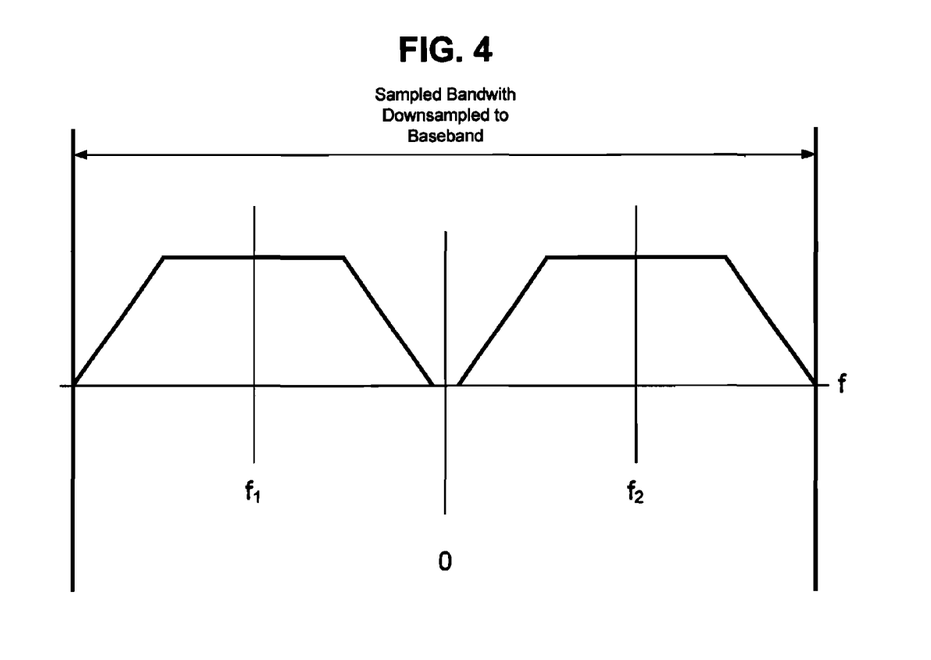
FIG. 4 is a frequency plot that illustrates a behavior of a signal evaluation system according to an embodiment.
Figure 5:
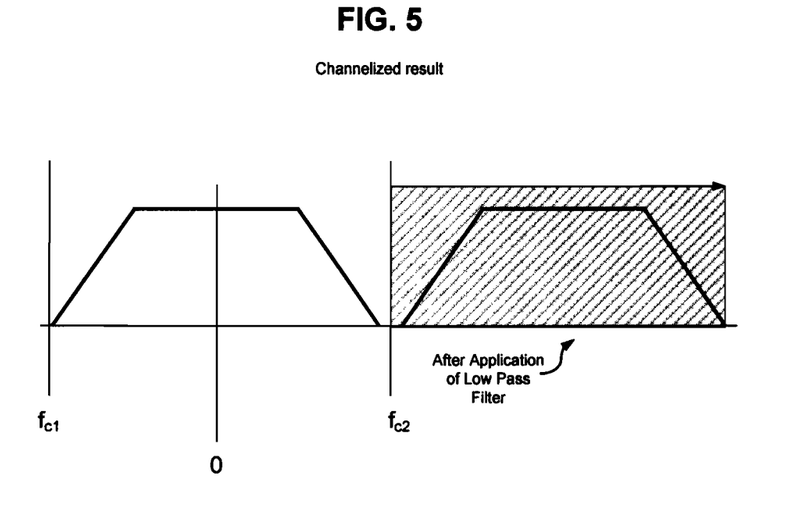
FIG. 5 is a frequency plot that illustrates the isolation of a channel signal according to an embodiment.
Figure 6A:
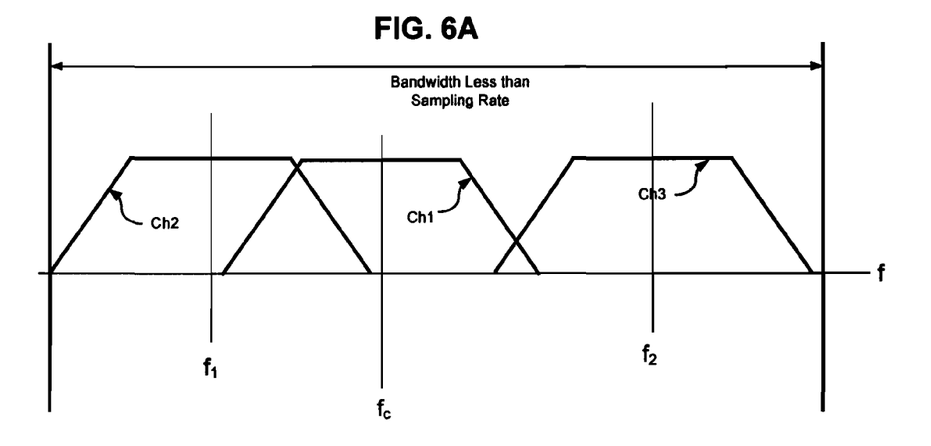
FIGS. 6A and 6B are frequency plots that illustrate the isolation of multiple overlapping channels identified in a single scan according to an embodiment.
Figure 6B:
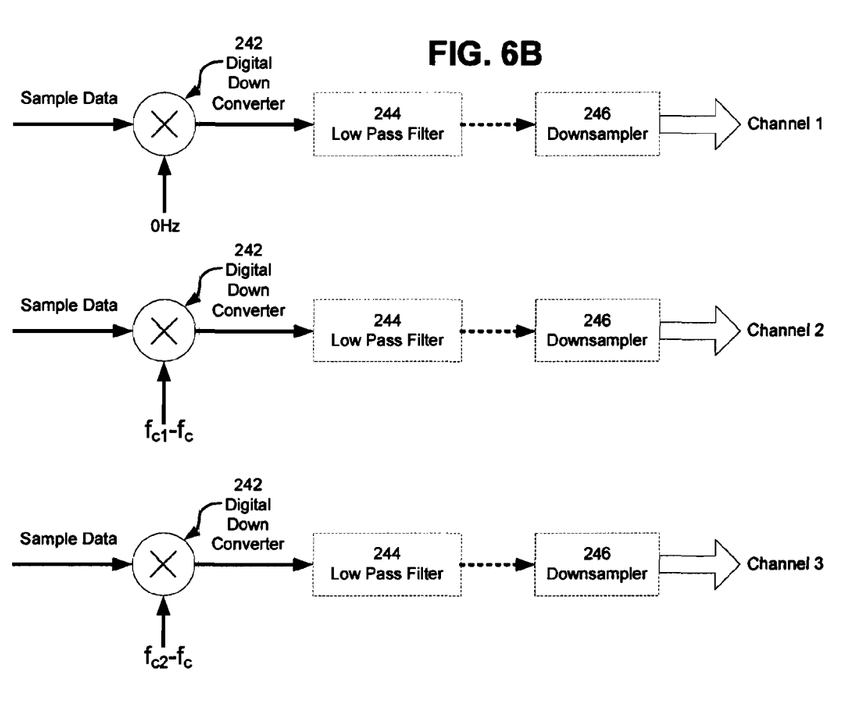

While FIGS. 4 and 5 illustrate non-overlapping channels, this may not always be the case. FIGS. 6A and 6B are frequency plot that illustrate the isolation of multiple overlapping channels identified in a single scan according to an embodiment. Referring to FIG. 6A, a wideband signal comprising channels 1, 2 and 3 is scanned by the RF card 204 and is sampled. As previously described, the sampling rate is greater than the bandwidth of the scanned signal. For this discussion, the channels 1, 2, and 3 are each assumed to be 5 MHz channels and the sampling rate is 15.36 MHz. The sample data are stored in acquisition buffer 210.

Referring to FIG. 6B, the acquisition channelizer 212 is configured to "channelize" the wide band signal by adjusting the frequency of the reference signal according to the frequency of each of the channels captured in the scan. The center frequency of channel 1 lies at the center of the wideband signal. No frequency shift is required and channel 1 is isolated by application of the low pass filter 244 and downsampler 246. Given the assumption that the channel width is 5 MHz and the sampling rate applied to the wideband signal is 15.36 MHz, the output of the low pass filter 244 is downsampled at 7.68 MHz.

The center frequency of channel 2 lies to the left of the center of the wideband signal. The frequency of this channel is shifted to the right by application of a reference signal of $f_{c1}$-$f_c$ and channel 2 is isolated by application of the low pass filter 244 and downsampler 246. The center frequency of channel 3 lies to the right of the center of the wideband signal. The frequency of this channel is shifted to the left by application of a reference signal of $f_{c2}$-$f_c$ and channel 3 is isolated by application of the low pass filter 244 and downsampler 246.

Referring again to FIG. 1, in an embodiment, the channels that are acquired may be determined from the user defined channel list 214.

The acquisition module FIG. 1, 220 may be configured to search each channelized channel from Acquisition Channelizer 212 for known signals related to the communication system to be evaluated. Any found signals, and data about the found signals, are stored in a target list datastore 230. For example, in GSM systems, an FCCH burst (used for frequency correction) has a known content and a known repeating cycle pattern and thus can be identified.

Similarly, in LTE systems, a sync signal contains two signals: primary sync signal (PSS) and secondary sync signal (SSS). Both sync signals are located in a 960 kHz band at the center of the signal and arrive in a symbol every 5 ms. There are three possibilities of PSS and 168 possibilities of SSS. Thus, there are 3*168=504 possibilities each of which is referred to as a Cell ID. The sync signal occupies about 945 kHz and an appropriate down sampler is selected to reduce the sampling rate to 960 kHz. In an embodiment, the acquisition module searches all sync signal inside the acquisition buffer 210. When the acquisition module detects a cell ID, the cell ID and the sync signal time of arrival are saved in a target in a list in the target list datastore 230.

The baseband signals received by RF Card 204 are also communicated to Tracking Buffer 240 where they are buffered before further analysis. The signals in the Tracking Buffer 240 are processed by a Tracking Channelizer 250 which extracts the channels that are received. Tracking Channelizer 250 receives information concerning the channels to be tracked from Target List Datastore 230. The results from Tracking Channelizer 250 concerning each tracked channel are processed by a tracking module 260 using the signals saved in the target list 230.

In an embodiment, the tracking module 260 may measure the signal power and the signal quality (e.g. signal to noise ratio) for a signal having a particular Cell ID and time of arrival. In an embodiment, the tracking module 260 comprises a logical or physical array. Each element of the array operates on the data from a single channel identified by the tracking channelizer 250. The processing can be implemented in parallel or sequentially.

Based on the user request channel list 207, DCE 206 calculates the center frequency of data collection necessary to collect signal information desired by the User Request Channel list. RF card 204 collects a wide band signal with a high sampling rate that is designed into the hardware. Channel List 214 informs the acquisition channelizer 212 of all possible signals that may be contained in the collected data. Acquisition channelizer 212 will channelize all signals and output the channelized signals to individual Acquisition Modules 220. As depicted in FIG. 1, there are different Acquistion Modules that can handle different wireless technologies, such as LTE, WCDMA, GSM, etc. 220 detects all signals and stores the results to Target List 230.

The target list data store 230, stores all the information relative to the detected signal(s). The information includes channel number, type of wireless technologies, time of arrival, Cell IDs, signal power, etc. The difference between User-defined Channel List 214 and Target List Data Store 230 is that User-defined Channel List 214 lists all the possible interfering channels based on prior knowledge whereas Target List Data Store 230 only store the list of channels for which signals have been detected. The difference between the User Request Channel List 207 and User-Defined Channel List 214 is that the User Request Channel List 207 comprises channel characteristics that a particular user desires to track for a particular scan. This list may not include all possible channel of interference from all transmitters that might exist in an area. Based on the information from the Target List Datastore 230, Tracking Channelizer 250 will filter out all channels that contain the signal that has been detected in Acquisition Module 220 and stored in Target List Datastore 230. This information is provided to Tracking module 260 which can then effectively and quickly track interfering signals in a given area during scanning operations.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A system for identifying interfering signals in a wideband wireless environment comprising:
   a programmable RF card configured for collecting and receiving wideband wireless signals;
   a data collection engine configured for:
      accepting a request channel list that identifies characteristics of a plurality of potential interfering channels of interest for a particular scanning operation; and
      providing instructions to the programmable RF card to collect a calculated band of wireless signals;
   an acquisition channelizer configured for:
      receiving the collected wideband wireless signals from the programmable RF card;
      comparing the collected signals against a user-defined channel list, the user-defined channel list comprising substantially all the possible interfering wideband signals that might be encountered in the particular scanning area of operation; and
   at least one acquisition module connected to the acquisition channelizer for receiving and categorizing detected individual interfering signals from the acquisition channelizer.

2. The system of claim 1 further comprising a target list data store configured for:
   storing the detected individual signals; and
   providing the detected individual signals to a tracking channelizer and to a tracking module, wherein
   the tracking channelizer is further configured for:
   channelizing the collected wideband signals based on the detected individual interfering signals using the characteristics of the detected signals from the target list datastore; and
   providing the channelized wideband signal data to at least one tracking module, and wherein
   the at least one tracking module is further configured for tracking the detected signals during scanning operations.

3. The system of claim 1 further comprising an acquisition buffer configured for:
   buffering the received wideband wireless signals; and
   providing the received wideband wireless signals to the acquisition channelizer.

4. The system of claim 1 further comprising a tracking buffer configured for:
   buffering the received wideband wireless signals; and
   providing the received wideband wireless signals to the tracking channelizer.

5. The system of claim 1 wherein the at least one acquisition module further comprises a plurality of acquisition modules, each associated with a particular interfering channel.

6. The system of claim 1 wherein the at least one tracking module further comprising a plurality of tracking modules, each associated with a particular interfering channel.

7. The system of claim 1 wherein the data collection engine is further configured for:
   combining multiple channels of the request channel list into a single data collection; and
   determining the center frequency around which the programmable RF card will collect wideband signals.

8. A method for identifying interfering signals in a wideband wireless environment comprising:
   establishing a request list of potentially interfering wideband signals in a scanning area;
   calculating, using a data collection engine, a center frequency for collection of the potentially interfering wideband signals in the request list in a single scan;
   programming a programmable RF card to collect the wideband wireless signals centered on the center frequency;
   collecting, using the programmable RF card, the potentially interfering wideband signals centered on the calculated center frequency in a single scan;
   processing the received wideband signals to identify the potentially interfering signals;
   providing the processed wideband signal data to a tracking module for tracking potentially interfering signals in a scanning area.

9. The method of claim 8, wherein processing the received wideband signals to identify the potentially interfering signals comprises:
   transmitting the collected wideband wireless signals to an acquisition channelizer; and
   extracting, using acquisition channelizer, the potentially interfering signals based upon a user defined channel list comprising substantially all of the potentially interfering wideband signals in a scanning area.

10. The method of claim 9 further comprising:
   providing the extracted signals from the acquisition channelizer to an acquisition module associated with a particular potentially interfering signal;
   extracting characteristics of the potentially interfering signal by the acquisition module; and
   storing the extracted characteristics of the potentially interfering signal in a target list datastore.

11. The method of claim 10, wherein processing the received wideband signals to identify the potentially interfering signals further comprises:
   transmitting the collected wideband wireless signals to a tracking channelizer;
   providing the extracted characteristics of the potentially interfering signal from the target list datastore to a tracking channelizer and to a tracking module;
   channelizing, using the tracking channelizer, the collected wideband signals based upon the extracted characteristics; and
   providing the channelized signals to a tracking module.

12. The method for identifying interfering signals in a wideband wireless environment of claim 11 wherein processing the received wideband signals to identify the potentially interfering signals further comprises:
   tracking, using the tracking module, the interfering signals during scanning operations.

13. A method for wideband wireless system scanning comprising:
- establishing a list of potentially interfering signals of interest for a scanning operation;
- calculating a center frequency for collection of the potentially interfering signals of interest;
- programming a programmable RF card to collect wideband wireless signals centered on the center frequency;
- collecting, using the programmable RF card, the wideband wireless signals centered on the calculated center frequency;
- transmitting the collected wideband wireless signals to an acquisition channelizer and to a tracking channelizer;
- extracting, using the acquisition channelizer, the potentially interfering signals based upon a user defined channel list comprising substantially all of the potentially interfering wideband signals in a scanning area;
- providing the extracted signals from the acquisition channelizer to an acquisition module associated with a particular potentially interfering signal;
- extracting, using the acquisition module, characteristics of the particular potentially interfering signal;
- storing the extracted characteristics in a target list datastore;
- providing the extracted characteristics from the target list datastore to the tracking channelizer and to a tracking module;
- channelizing, using the tracking channelizer, the collected wideband signals and providing the channelized signals to the tracking module; and
- tracking, using the tracking module, the interfering signals during scanning operations.

* * * * *